(12) United States Patent
Comer

(10) Patent No.: US 12,296,751 B2
(45) Date of Patent: May 13, 2025

(54) ADAPTIVE PERIMETER SECURITY SYSTEM FOR VEHICLES

(71) Applicant: Christopher B. Comer, Wayne, MI (US)

(72) Inventor: Christopher B Comer, Wayne, MI (US)

(73) Assignee: Christopher B. Comer, Wayne, MI (US)

( * ) Notice: Subject to any disclaimer, the term of this patent is extended or adjusted under 35 U.S.C. 154(b) by 49 days.

(21) Appl. No.: 18/174,630

(22) Filed: Feb. 26, 2023

(65) Prior Publication Data

US 2023/0278499 A1 Sep. 7, 2023

Related U.S. Application Data

(60) Provisional application No. 63/315,946, filed on Mar. 2, 2022.

(51) Int. Cl.
*B60R 1/27* (2022.01)

(52) U.S. Cl.
CPC ...................................... *B60R 1/27* (2022.01)

(58) Field of Classification Search
CPC ........................................................ B60R 1/27
See application file for complete search history.

(56) References Cited

U.S. PATENT DOCUMENTS

| | | | | |
|---|---|---|---|---|
| 9,906,722 B1* | 2/2018 | Gigot | .................. | H04N 23/651 |
| 10,410,069 B2* | 9/2019 | Han | .......................... | B60R 1/28 |
| 11,012,666 B2* | 5/2021 | Park | ........................ | G06V 20/56 |
| 11,616,932 B1* | 3/2023 | Xu | ........................... | H04W 4/38 |
| | | | | 348/207.99 |
| 11,623,565 B1* | 4/2023 | Okunoye | ............... | B60K 35/50 |
| | | | | 348/373 |
| 11,697,372 B1* | 7/2023 | Hubbell | .................. | H04N 7/181 |
| | | | | 701/1 |
| 11,787,350 B2* | 10/2023 | Wingarten | ................ | B60R 1/24 |
| | | | | 348/148 |
| 2003/0076415 A1* | 4/2003 | Strumolo | ............... | H04N 7/183 |
| | | | | 348/E7.087 |
| 2014/0049912 A1* | 2/2014 | Marshall | .............. | H04B 1/3877 |
| | | | | 361/679.01 |
| 2014/0267687 A1* | 9/2014 | Loghmani | ................. | B60R 1/28 |
| | | | | 348/113 |
| 2017/0132480 A1* | 5/2017 | Han | ........................ | G06T 7/246 |
| 2017/0305360 A1* | 10/2017 | Zajac | ....................... | B60R 11/04 |
| 2017/0371339 A1* | 12/2017 | Charette | ........... | B60W 60/0016 |
| 2018/0244240 A1* | 8/2018 | Etonye | ....................... | B60R 1/02 |
| 2019/0315409 A1* | 10/2019 | Ghannam | ............... | B60R 11/00 |
| 2019/0359147 A1* | 11/2019 | Zajac | ....................... | B60R 11/04 |
| 2021/0099127 A1* | 4/2021 | Damaraju | ................. | B60L 1/20 |

(Continued)

*Primary Examiner* — Fernando Alcon

(57) ABSTRACT

An embodiment designed to be attached to a vehicle comprising of multiple sensors and AI/ML cameras that provide round the clock perimeter surveillance for said vehicle. The embodiment utilizes data from the sensors and cameras to identify potential threats, accidents or an occurrence of damage to the vehicle. The device provides communication of processed events and provides notifications to end-user (vehicle owner) utilizing wireless communications. The embodiment itself is self-powered utilizing solar power to keep an internal battery pack charged for day and night operation of the entire electronic system.

20 Claims, 4 Drawing Sheets

(56) References Cited

U.S. PATENT DOCUMENTS

| | | | | |
|---|---|---|---|---|
| 2021/0152991 A1* | 5/2021 | Wu | ................... | H04L 1/1864 |
| 2021/0302541 A1* | 9/2021 | Fields | ................... | H05K 7/14 |
| 2021/0346556 A1* | 11/2021 | Manka | ................... | A61L 2/24 |
| 2022/0146632 A1* | 5/2022 | Laverne | ................ | G01S 7/4813 |
| 2022/0368819 A1* | 11/2022 | Samson | ................ | G06V 20/56 |
| 2022/0402435 A1* | 12/2022 | Saville | ................ | G06F 3/0488 |
| 2023/0026675 A1* | 1/2023 | Wingarten | ............ | F16M 13/022 |
| 2023/0119975 A1* | 4/2023 | Diehl | ................... | G01S 17/87 |
| | | | | 701/28 |
| 2023/0214728 A1* | 7/2023 | Danilyuk | ................ | G06N 5/01 |
| | | | | 706/12 |
| 2023/0219582 A1* | 7/2023 | Diehl | ................... | G01S 17/931 |
| | | | | 701/1 |
| 2023/0269463 A1* | 8/2023 | Salter | ................... | H04N 23/66 |
| | | | | 701/28 |
| 2023/0322265 A1* | 10/2023 | Anderson | ......... | B60W 60/0025 |
| | | | | 701/24 |
| 2023/0342880 A1* | 10/2023 | Ogorodnikov | ........... | G06T 13/40 |

* cited by examiner

ADAPTIVE PERIMETER SECURITY SYSTEM FOR VEHICLES

CROSS-REFERENCE TO RELATED APPLICATIONS

This application claims the benefit of priority of U.S. provisional patent application filed on Mar. 2, 2022 having Application No. 63/315,946, and EFS ID Number 45131675 with the same title "An Adaptive Perimeter Security System for Vehicles", as referenced here for all intents and purposes.

PRIOR ART

It is inferred that vehicle security systems utilize sensor data to determine potential security threats or intrusion of said vehicle. However, these systems are usually built into a vehicle or attached internally to the vehicle in some manner, but don't provide adaptive security as part of their function. As an example of prior art; U.S. Pat No. 20220126843 A1, issued 2022 Apr. 28, entitled "PROACTIVE VEHICULAR SECURITY SYSTEM", to Dean; Eric J., demonstrates a vehicle security system utilizing LIDAR instead of cameras. The patent doe not mention use of Artificial Intelligence (AI) nor Machine Learning (ML) technology to make the system adaptable. The patent also does not describe a system that concentrate its sensors into one embodiment attached to one location upon a vehicle. Having the sensors within one embodiment at one location simplifies the design and placement. It is also more likely to have an unobstructed view of the vehicle surroundings when the high point of said vehicle is utilized.

BACKGROUND OF THE INVENTION

Typical vehicle security systems only respond with an alarm during positive and false positive security breaches; mostly defined by a motion detection of the vehicle when activated. These types of passive systems do not decern from weather conditions, loud noises, or accidental tripping of the alarm—making these types of alarms easily ignored for true events.

There are more advanced vehicle security systems, but these systems are meant for automotive OEM specific vehicles. The invention that is being presented in this document is a system that is not vehicle make or model specific, but designed to attach to any vehicle's rooftop with a contiguous hard surface. It is also dynamic in behavior; utilizing a multitude of sensors to analyze the surrounding environment for threats, potential threats and prevention of false threats. The unique use of being placed on the roof top of the vehicle can give a high vantage point to allow for a potentially unobstructed view of the surrounding area.

SUMMARY OF THE INVENTION

The present invention comprises of a unique way to add smart automated perimeter security to a vehicle while being self-powered. The invention utilizes multiple sensors and cameras strategically placed in a unique enclosure design, to intelligently (via artificial intelligence and/or machine learning) process the vehicle's vicinity (in day or night) for potential and current threats ultimately notifying the vehicle's owner (end-user) via a mobile phone software application. Information presented to the end-user allows an informed decision to intervene or contact authorities to present the recorded evidence of the incident.

BRIEF DESCRIPTION OF DRAWINGS

The following drawings illustrates one possible implementation of the concept of the invention presented.

DETAILED DESCRIPTION OF THE INVENTION

The presented material is considered an exemplification of the described invention, and is not intended to be a limitation of the invention to the disclosed figures or description to be followed.

Figure 1:
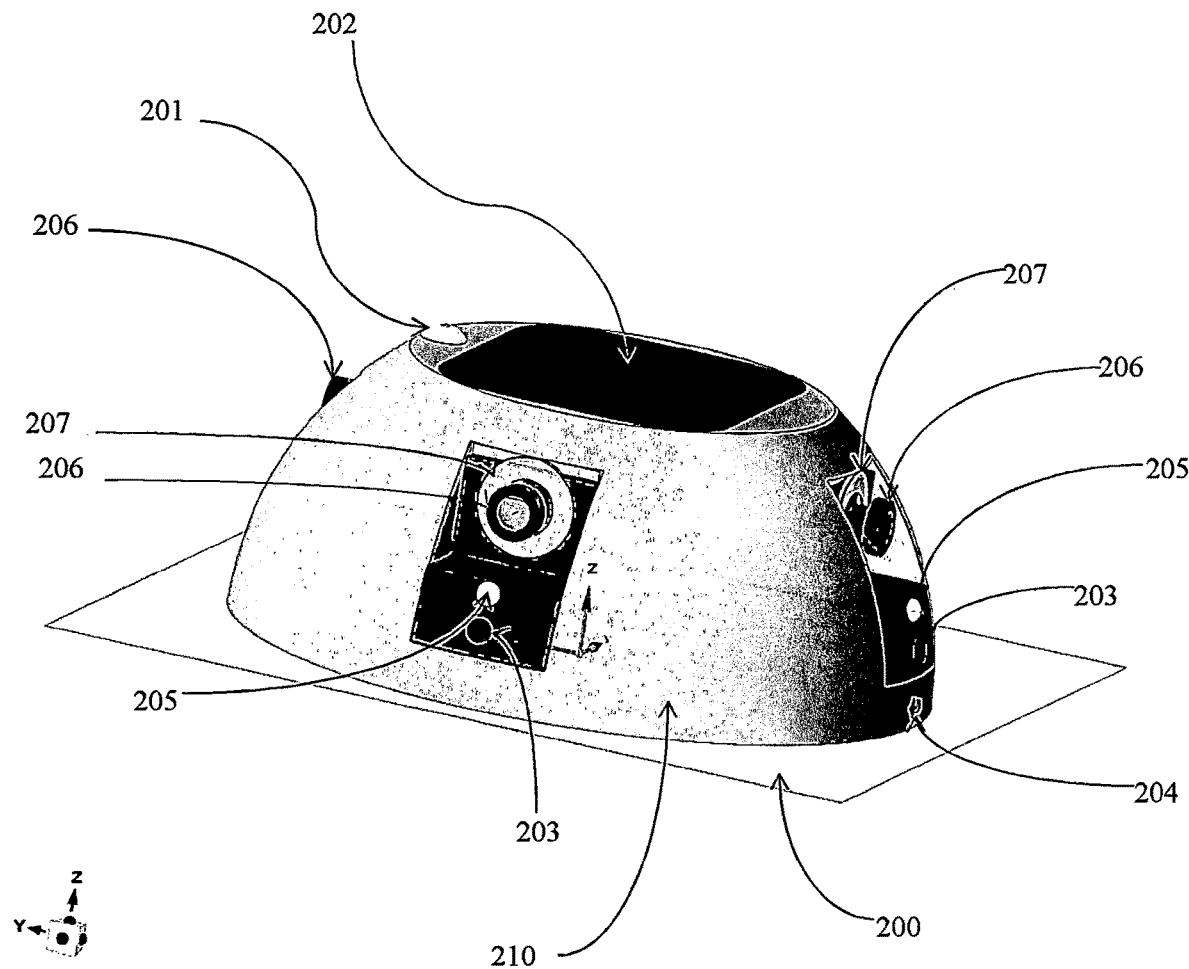
FIG. 1 Illustrates the overall construct of the invention from isometric viewpoint.

The following details will be in referenced to the figures submitted along with this document and represents a preferred embodiment of the invention. FIG. 1(FIG. 1) shows the placement of sensors (202, 203, and 205), cameras 206, and night lighting 207 as presented within the invention's enclosure 210. This preferred embodiment of the enclosure is composed primarily of plastic material that can withstand being hit by objects at highway speeds while being connected to vehicle surface 200. The figure also shows the location of the solar panel 201 and USB connection 204 that are part of the electrical system of the invention.

Figure 3:
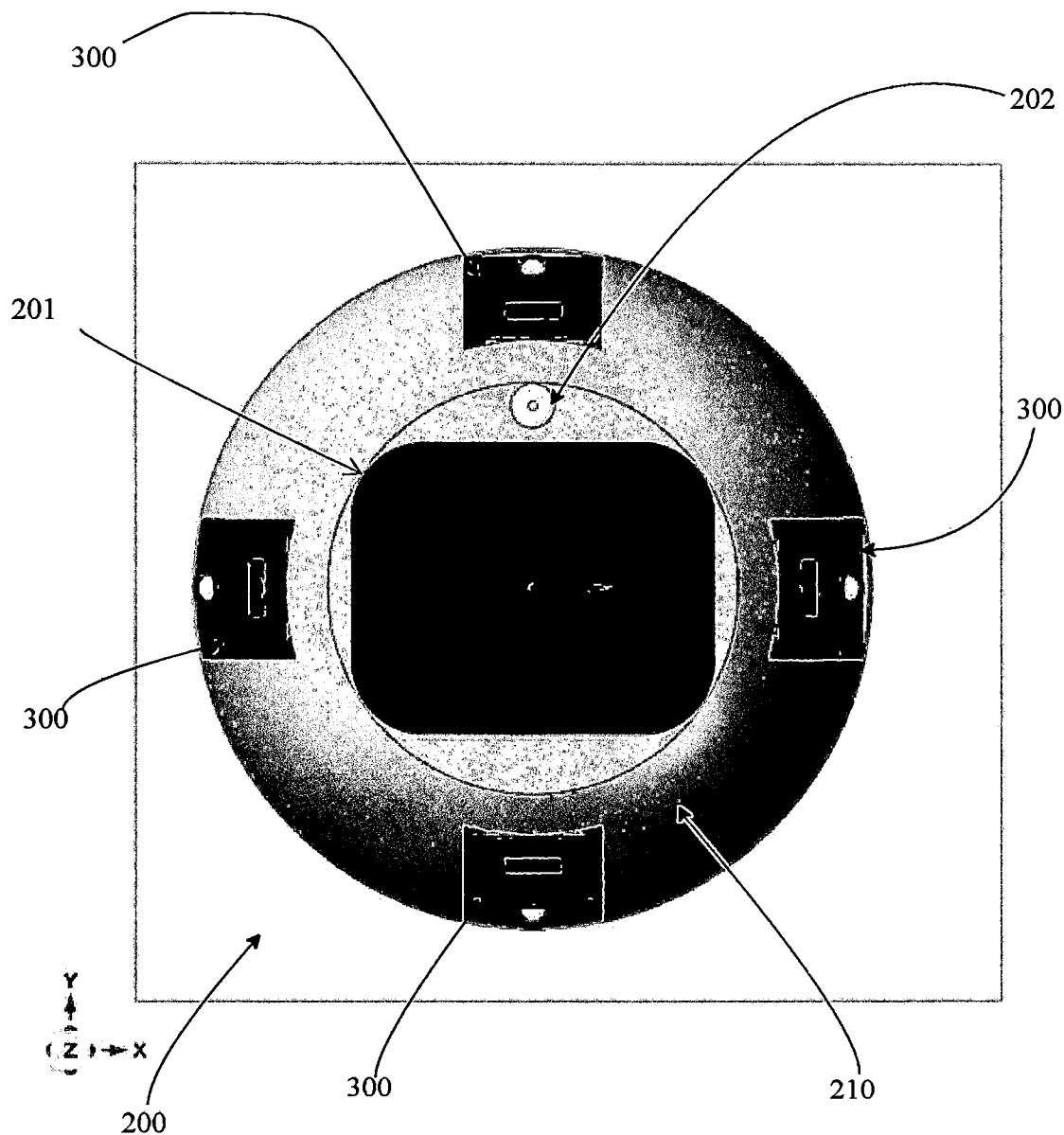
FIG. 3 Shows the top view of the invention.

FIG. 3 (FIG. 3) illustrates the overhead view of the invention showing the four modules 300 oriented in north, east, south and west directions. East direction (positive x) faces forward towards the front as attached to the vehicle that the invention is place upon. Each of the modules contain 202, 203, 205, 206 and 207.

Figure 2:
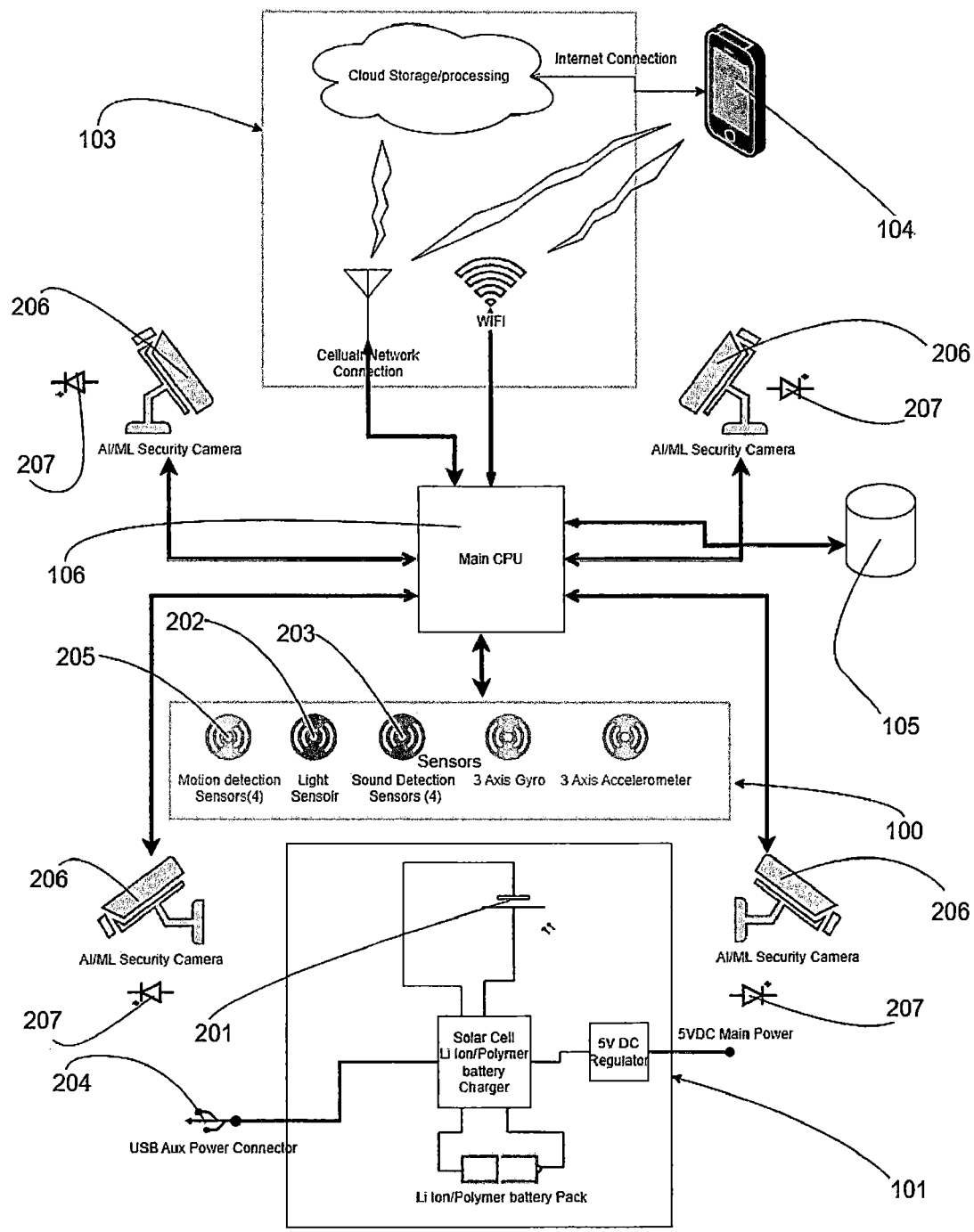
FIG. 2 Presents the system diagram for the invention.
Figure 4:
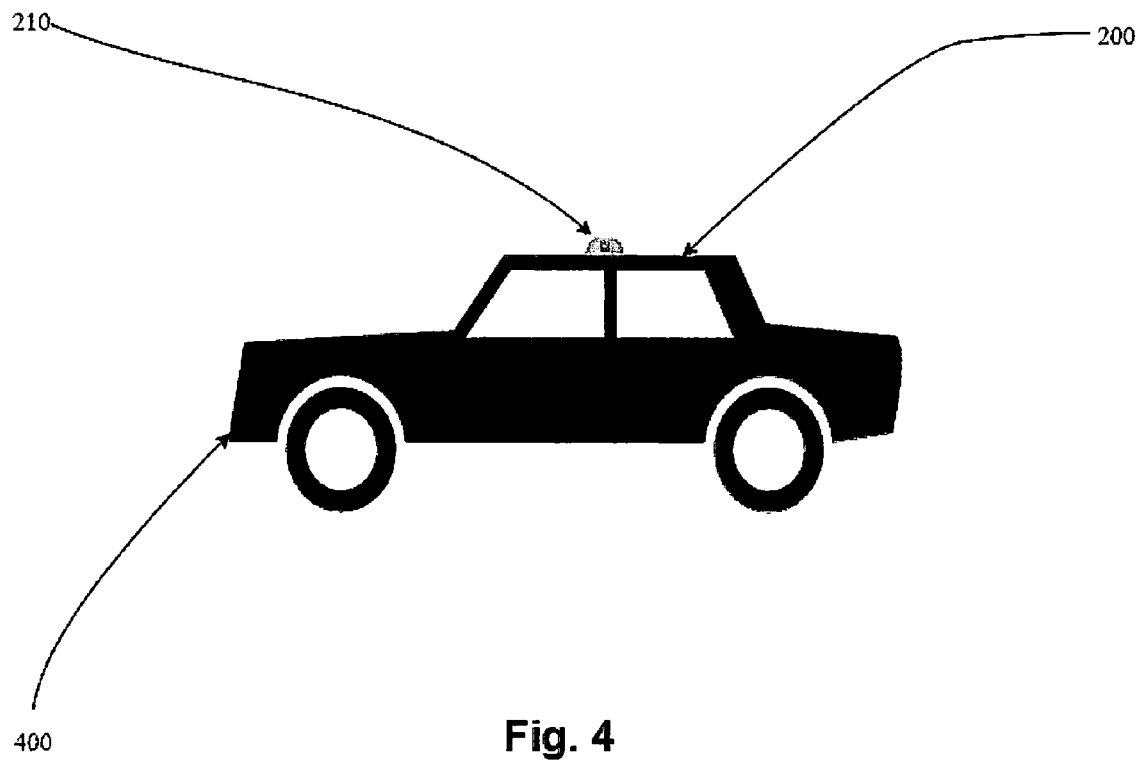
FIG. 4 Illustrates how the invention would be located on a vehicle.

FIG. 2 (FIG. 4) shows the system architecture for the invention and how all the involved elements are connected. There are essentially seven main sections of the architecture identified by 100 through 106. Whereas, sensor array 100 is composed of the sensors that are used to capture the state of the environment within the vicinity of the vehicle that the invention is attached. Motion detection sensors 205 detect when a human body is in the direction that it is pointed. Light sensor 202 indicates dark or illuminated environment that invention is within. Sound detectors 203 can provide an indication of talking in the vicinity, gun fire, or a tire screeching before an occurrence of an accident, as examples. Recording of sound will also be possible via 203. Finally, the three-axis gyro and accelerometer provide rotation and linear motion information of the attached vehicle. These sensors can indicate the vehicle has been in an accident, hit by an object, or is in motion.

The section 101 identifies the basic elements of the system power. The system utilizes a solar powered based system to keep the Li Ion/Polymer battery pack charged for low luminance operation (night time operation). Power from the battery pack is regulated to 5 VDC for distribution to the rest of the system. The battery pack capacity is chosen as to provide low light operation and, therefore, full day perimeter monitoring. There is an auxiliary USB connection 204 to provide another way of charging the battery pack, if needed.

Section 103 shows the types communications implemented in the invention for communicating information to the end-user via a smart phone application on the end-user's smart phone 104 and/or processed in the "cloud" for later use. The invention will have both WIFI and Cellular communications to allow 104 to connect near home or away when needed.

The final sections 105 along with 106 provide information processing and storage of data related to the aforementioned sections. The system for the invention is defaulted to an idle state when there are no events to take it out of this state. An event could be, as one example, a person approaching the vehicle with the invention attached detected by 205. This would take 106 out of idle and look for an indication of an intruder using AI/ML cameras 206 to determine if the intruder is someone that the system should notify the end-user of their close proximity. These cameras are outfitted with LED lighting 207 to allow operation in a low luminance environment for better video capturing of event. Data (captured video and sensor data) from the event is temporarily stored within 105 and can be transferred wireless to Cloud services and/or to the end-user as directed by the smart phone application. This is only one example; the system of the invention is capable of detecting other types of events depending, again, on settings chosen by the end-user via the smart-phone application.

The last figure (FIG. 4) depicts how the invention 210 would be located on the surface 200 of a vehicle 400. This particular vehicle illustration is that of a four-door automobile, but is only used in this figure as a demonstration of invention and not to limit its application. The invention 210 attaches to surface 200 via adhesion using a glue, epoxy, or mechanical connection to the vehicle. The types of adhesion mentioned provide essentially a permanent attachment to the vehicle. It is foreseeable that there could be a need to make invention 210 removable from surface 210 and be reattached when desired. So, in this configuration invention 210 would lock onto a base that would adhere to surface 200 of the vehicle.

The invention claimed is:

1. A vehicle security apparatus, comprising:
   (a) an enclosure having a top surface and a bottom surface, wherein the bottom surface is configured to couple with a vehicle;
   (b) a sensor array configured to monitor one or more conditions of an area;
   around the vehicle, including:
      (i) a photosensor operable to detect incident light and generate a first data signal correlating to the detected incident light,
      (ii) a sound sensor operable to detect sound and generate a second data signal correlating to the detected sound, and
      (iii) a motion sensor operable to detect motion and generate a third data signal correlating to the detected motion;
   (c) a camera operable to transition between an active mode and an idle mode; wherein the camera is configured to receive an activation signal to thereby transition the camera from the idle mode to the active mode, wherein in the active mode the camera is configured to generate a video recording of a portion of the area around the vehicle;
   (d) a processor coupled with a memory storage device, wherein the memory storage device stores a machine learning algorithm and a set of user pre-defined monitoring condition thresholds therein respective to the first, second, and third data signals, wherein the processor is configured to:
      (i) receive the first, second, and third data signals,
      (ii) determine whether any one of the first, second, and third data signals meets or exceeds its respective user pre-defined monitoring condition threshold, and
      (iii) upon any one of the first, second, and third data signals meeting or exceeding its respective user pre-defined monitoring condition threshold, generating the activation signal for the camera to generate the video recording, and
      (iv) upon receiving the video recording, the machine learning, algorithm is operable to input the video recording and is pre-trained with a machine learning dataset to output a positive or negative determination respective to a vehicle safety condition, wherein a positive determination identifies a safety concern; and
   (e) a communications module configured to communicate with a data server that is remotely accessible by a user device, wherein upon the machine learning algorithm outputting a positive determination respective to the vehicle safety condition the communications module is configured to transfer an alert data signal to the user device via the data server that includes the safety concern; and
   (f) the enclosure enclosing the processor and the communications module and being configured to accommodate the sensor array and the camera outwardly facing from the enclosure.

2. The vehicle security apparatus of claim 1, comprising a solar panel on the top surface of the enclosure, wherein the solar panel is operable to harvest solar energy and selectively power the vehicle security apparatus from the harvested solar energy.

3. The vehicle security apparatus of claim 1, wherein the camera includes an LED light configured to activate when the camera is operating in low luminance conditions.

4. The vehicle security apparatus of claim 1, comprising a three-axis gyroscope operable to detect rotation of the vehicle and generate a fourth data signal correlating to the detected rotation.

5. The vehicle security apparatus of claim 1, comprising a three-axis accelerometer operable to detect linear motion of the vehicle and generate a fifth data signal correlating to the detected linear motion.

6. The vehicle security apparatus of claim 1, wherein the memory storage device is configured to receive and store the video recording therein.

7. The vehicle security apparatus of claim 1, wherein the memory storage device is configured to receive and store at least one of the first data signal, the second data signal, and the third data signal therein.

8. The vehicle security apparatus of claim 1, wherein the processor is configured to receive the first data signal, the second data signal, and the third data signal irrespective of whether the vehicle is in use or occupied, and whereby the processor is configured to generate the activation signal and the camera is operable to generate the video recording irrespective of whether the vehicle is in use or occupied.

9. The vehicle security apparatus of claim 1, wherein the enclosure includes a plurality of brackets configured to affix to a vehicle.

10. A vehicle security apparatus for coupling to a vehicle, comprising:
   (a) a sensor array configured to monitor one or more conditions of an area around the vehicle, including:
      (i) a photosensor operable to detect incident light and generate a first data signal correlating to the detected incident light;

(ii) a sound sensor operable to detect sound and generate a second data signal correlating to the detected sound; and (iii) a motion sensor operable to detect motion and generate a third data signal correlating to the detected motion;

(b) a processor coupled with a memory storage device, wherein the processor is configured to:

(i) receive the first data signal, the second data signal, and the third data signal irrespective of whether the vehicle is in use or occupied, and (ii) generate an activation signal if any one of the first data signal, second data signal, or third data signal exceeds a respective predefined threshold;

(c) a camera operable in an active mode and an idle mode, wherein the camera, is configured to receive the activation signal irrespective of whether the vehicle is in use or occupied to thereby transition the camera from the idle mode to the active mode, wherein in the active mode the camera is configured to generate a video recording of a portion of the area around the vehicle;

(d) a solar panel selectively operable to harvest solar energy and power the vehicle security apparatus from the harvested solar energy; and (e) a communications module configured to communicate with a data server that is remotely accessible by a user device, wherein when the first data signal, second data signal, or third data signal exceeds the predefined threshold the communications module is configured to transfer an alert data signal to the user device via the data server; and (f) an enclosure having a top surface and a bottom surface, wherein the bottom surface is configured to couple with the vehicle, the enclosure enclosing the processor and the communications module and being configured to accommodate the sensor array and the camera outwardly facing from the enclosure.

11. The vehicle security apparatus of claim 10, wherein the memory storage device stores a machine learning algorithm and the respective predefined thresholds therein, wherein the machine learning algorithm is operable to input the video recording and is pre-trained with a machine learning dataset to output a vehicle safety determination based thereon.

12. The vehicle security apparatus of claim 10, wherein the camera includes an LED light configured to activate when the camera is operating in low luminance conditions.

13. The vehicle security apparatus of claim 10, comprising a three-axis gyroscope operable to detect rotation of the vehicle and generate a fourth data signal correlating to the detected rotation.

14. The vehicle security apparatus of claim 10, comprising a three-axis accelerometer operable to detect linear motion of the vehicle and generate a fifth data signal correlating to the detected linear motion.

15. The vehicle security apparatus of claim 10, wherein the camera is configured to generate the video recording irrespective of whether the vehicle is in use or occupied.

16. A vehicle security apparatus for coupling to a vehicle, comprising:

(a) a first data collection module configured to monitor and record one or more, conditions of an area around the vehicle, including:

(i) a photosensor operable to detect incident light and generate a first data signal correlating to the detected incident light, (ii) a sound sensor operable to detect sound and generate a second data signal correlating to the detected sound, (iii) a motion sensor operable to detect motion and generate a third data signal correlating to the detected motion, and (iv) a camera configured to generate a video recording of a portion of the area around the vehicle, wherein the camera includes an LED light configured to activate when the camera is operating in low luminance conditions;

(b) a processor coupled with a memory storage device, wherein the memory storage device stores a machine learning algorithm and a user pre-defined monitoring condition threshold dataset therein, wherein the user pre-defined monitoring condition threshold dataset includes threshold conditions for each of the first data signal, second data signal, and third data signal, wherein upon any one of the first data signal, second data signal, and third data signal meeting or exceeding its respective threshold condition, the machine learning algorithm is configured to input the video recording and is pre-trained with a machine learning dataset to output a vehicle safety condition determination based upon the video recording; and (c) a communications module configured to communicate with a data server that is remotely accessible by a user device; and (d) an enclosure having a top surface and a bottom surface, wherein the bottom surface is configured to couple with the vehicle, the enclosure enclosing the processor and the communications module and being configured to accommodate the first data collection module and the camera outwardly facing from the enclosure.

17. The vehicle security apparatus of claim 16, wherein upon the machine learning algorithm determining a positive vehicle safety condition indicating a safety concern, the communications module is configured to transfer an alert data signal to the user device via the data server including the positive vehicle safety condition.

18. The vehicle security apparatus of claim 16, comprising a second data collection module, and third data collection module, and a fourth data collection module, each having the same components as the first data collection module.

19. The vehicle security apparatus of claim 18, wherein each data collection module of the first, second, third, and fourth data collections modules is positioned such that the camera of each data collection module is aimed in a direction that is approximately 90 degrees offset from the two nearest adjacent cameras.

20. The vehicle security apparatus of claim 16, comprising a solar panel operable to harvest solar energy and selectively power the vehicle security apparatus from the harvested solar energy.

* * * * *